United States Patent
Elder et al.

(10) Patent No.: US 9,417,869 B2
(45) Date of Patent: *Aug. 16, 2016

(54) VISUALIZING A CONGRUENCY OF VERSIONS OF AN APPLICATION ACROSS PHASES OF A RELEASE PIPELINE

(71) Applicant: International Business Machines Corporation, Armonk, NY (US)

(72) Inventors: Michael D. Elder, Durham, NC (US); Sara Russell, Ridgeville, OH (US); Lucinio Santos, Durham, NC (US); John-Mason P. Shackelford, Bay Village, OH (US); John E. Swanke, Terryville, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/537,431

(22) Filed: Nov. 10, 2014

(65) Prior Publication Data

US 2016/0132324 A1    May 12, 2016

(51) Int. Cl.
  *G06F 9/44* (2006.01)
  *G06F 9/445* (2006.01)
  *G06F 3/0482* (2013.01)
  *G06F 3/0484* (2013.01)

(52) U.S. Cl.
  CPC ............... *G06F 8/71* (2013.01); *G06F 3/0482* (2013.01); *G06F 3/04842* (2013.01); *G06F 8/65* (2013.01)

(58) Field of Classification Search
  CPC .......................................................... G06F 8/71
  USPC .................................................. 717/120, 121
  See application file for complete search history.

(56) References Cited

U.S. PATENT DOCUMENTS

| 2005/0074022 | A1 | 4/2005 | Kato | |
| 2006/0015807 | A1* | 1/2006 | Chellis | G06F 17/2288 715/229 |
| 2006/0064634 | A1 | 3/2006 | Dettinger et al. | |
| 2007/0011334 | A1* | 1/2007 | Higgins | G06F 11/3604 709/227 |
| 2007/0109303 | A1* | 5/2007 | Muramatsu | G01C 21/32 345/440 |
| 2008/0059894 | A1* | 3/2008 | Cisler | G06F 11/1469 715/762 |

(Continued)

OTHER PUBLICATIONS

Gall et al, Visualizing Software Release Histories: The Use of Color and Third Dimension, Software Maintenance, 1999. (ICSM '99) Proceedings. IEEE International Conference on Aug. 30, 1999, pp. 99-108.

(Continued)

*Primary Examiner* — Chameli Das
(74) *Attorney, Agent, or Firm* — Steven L. Nichols; Fabian Vancott

(57) ABSTRACT

A system for visualizing a congruency of versions of an application across phases of a release pipeline includes a selecting engine to select a phase from a number of phases; a representing engine to represent, via a user interface (UI), a congruency for a number of versions of an application compared against a target version of the application across the phases of a release pipeline, the congruency for the number of versions of the application represented with identifiers; a differentiating engine to differentiate a latest-deployed version of the application against a planned version of the application in a particular environment; and a comparing engine to compare, based on a selection, properties of the versions of the application.

18 Claims, 11 Drawing Sheets

(56) References Cited

U.S. PATENT DOCUMENTS

| | | | |
|---|---|---|---|
| 2008/0178153 A1* | 7/2008 | Fox | G06F 9/4435 717/122 |
| 2011/0106795 A1* | 5/2011 | Maim | G06F 17/2229 707/728 |
| 2011/0282575 A1* | 11/2011 | Masuda | G01C 21/3626 701/533 |
| 2012/0254865 A1* | 10/2012 | Saeki | G06F 9/45533 718/1 |
| 2015/0007155 A1* | 1/2015 | Hoffman | G06F 8/65 717/168 |
| 2015/0100955 A1* | 4/2015 | Chen | G06F 8/65 717/170 |

OTHER PUBLICATIONS

List of IBM Patents or Patent Applications Treated as Related; Jun. 8, 2015.

* cited by examiner

VISUALIZING A CONGRUENCY OF VERSIONS OF AN APPLICATION ACROSS PHASES OF A RELEASE PIPELINE

BACKGROUND

The present invention relates to visualizing a congruency of versions of an application, and more specifically, to visualizing a congruency of versions of an application across phases of a release pipeline.

The lifecycle of an application may include a number of phases, such as a development phase, a certification phase, a quality assurance phase, a performance test phase, a system integration phase, a production phase, and other phases. Each of these phases may include one or more versions of the application. The phases aid a release manager to visualize the delivery of the application throughout the lifecycle of the application.

BRIEF SUMMARY

A method for visualizing a congruency of versions of an application across phases of a release pipeline includes representing, via a user interface (UI), a congruency for a number of versions of an application compared against a target version of the application across phases of a release pipeline, the congruency for the number of versions of the application represented as identifiers, differentiating a latest-deployed version of the application against a planned version of the application in a particular environment, and comparing, based on a selection, properties of the versions of the application.

A system for visualizing a congruency of versions of an application across phases of a release pipeline includes a selecting engine to select a phase from a number of phases, a representing engine to represent, via a UI, a congruency for a number of versions of an application compared against a target version of the application across the phases of a release pipeline, the congruency for the number of versions of the application represented as identifiers, a differentiating engine to differentiate a latest-deployed version of the application against a planned version of the application in a particular environment, and a comparing engine to compare, based on a selection, properties of the versions of the application.

A computer program product includes a computer readable storage medium, the computer readable storage medium having computer readable program code embodied therewith. The computer readable program code having computer readable program code to represent, via a UI, a congruency for a number of versions of an application compared against a target version of the application across phases of a release pipeline, the congruency for the number of versions of the application represented as identifiers.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
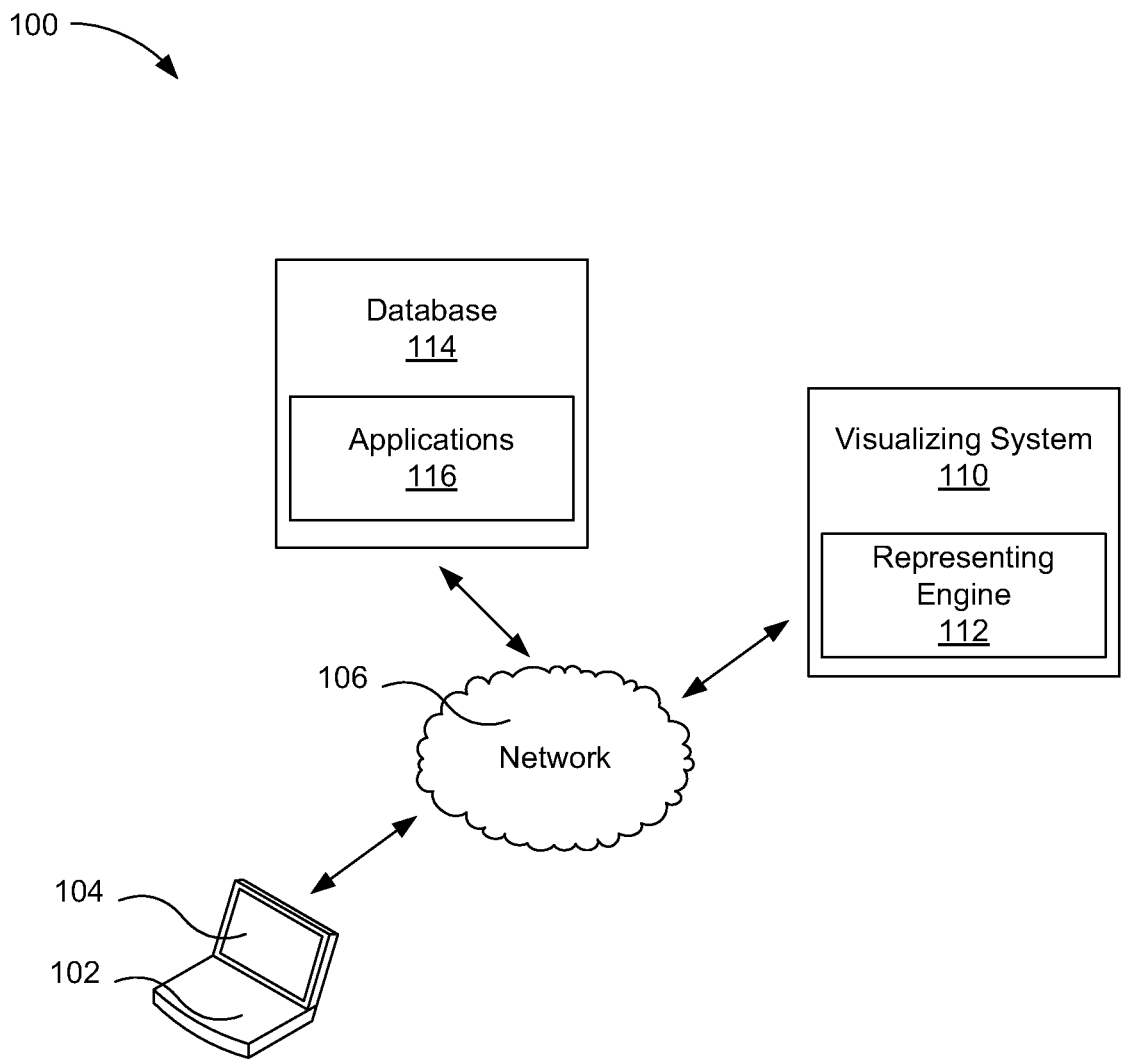
FIG. 1 is a diagram of an example of a system for visualizing a congruency of versions of an application across phases of a release pipeline, according to one example of principles described herein.

The present specification describes a method and system for visualizing a congruency of versions of an application across phases of a release pipeline, such that difference and similarities between several versions of several applications for several phases are visually represented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the lifecycle of an application may include a number of phases. These phases may include a development phase, a certification phase, a quality assurance phase, a performance test phase, a system integration phase, a production phase, and other phases. Each of the phases may include one or more versions of the application. The phases aid a release manager to visualize the delivery of the application throughout the lifecycle of the application.

Often, the lifecycle of the application may be represented as a table. The table may include an application and the versions of the application for each of the phases. A user may manually navigate the table to retrieve information, such as properties about the versions of the application for each of the phases. The user may manually compare the properties for several versions of the application for several phases. As a result, the user manually determines differences and similarities between the several versions of the application for the phases.

The table may include several applications, several versions for each of the applications, and several phases. Manually determining differences and similarities between several versions of several different applications over several phases may be a burdensome task for the user.

The principles described herein include a system and a method for visualizing a congruency of versions of an application across different phases of a release pipeline. Such a system and method includes representing, via a user interface (UI), a congruency for a number of versions of an application compared against a target version of the application across phases of a release pipeline, the congruency for the number of versions of the application represented as identifiers, differentiating a latest-deployed version of the application against a planned version of the application in a particular environment, and comparing, based on a selection, properties of the versions of the application. Such a method and system visually represents a congruency of different versions of the applications across the phases of a release pipeline. As a result, the system and method visually aids a user to determine differences and similarities between several versions of several applications for several phases.

In the specification and appended claims, the term "phase" means a stage of development for an application. In various examples, a phase may be a development phase, a certification phase, a quality assurance phase, a performance test phase, a system integration phase, a production phase, other phases, or combinations thereof. Other phases may be suited to aid a release manager to visualize the delivery of applications throughout the lifecycle.

In the specification and appended claims, the term "application" means one or more set of computer programs designed to carry out a specific task. During development and thereafter, an application may include a number of versions. These different versions may allow an application to execute in different specific environments. Alternatively, the version may correspond to a phase that the application is currently in.

In the specification and appended claims, the term "target version" means a specific version of an application that all other versions of the application are compared against. A user or developer may select the target version. Alternatively, the user may select a phase which in turn dictates a target version.

In the specification and appended claims, the term "first identifier" means a mechanism to visually aid a user to identify a version of an application that matches a target version of that application. More specifically, the first identifier may aid the user to visually determine that a version of an application is the same as a target version of the application. For example, the first identifier may be represented as a specific color, line weight, a numeric or other scale, a pattern, other representations, or combinations thereof. As will be described in the specification, the first identifier may be a horizontal pattern which usually signifies a positive result or ability.

In the specification and appended claims, the term "second identifier" means a mechanism to visually aid a user to identify a concurrency of a version of an application when compared against a target version of the application. More specifically, the second identifier may aid the user to visually determine how similar other versions of an application are to the target version of the application. For example, the second identifier may be represented as a pattern such as dots of varying intensity, varying intensity color, different line weights, a numeric or other scale, other representations, or combinations thereof. As will be described in the specification, the first identifier may be a dot pattern. The second identifier's intensity may be varied such that a user may visually determine the concurrency of a version of an application when compared against a target version. For example, the darker the dot pattern of the second identifier, the more the indicated version of an application matches the target version of the application.

In the specification and appended claims, the term "third identifier" means a mechanism to visually aid a user to identify a latest-deployed version of the application. For example, the third identifier may be represented as a color of varying intensity, different line weights, a numeric or other scale, a pattern, other representations, or combinations thereof. As will be described in the specification, the third identifier may be the color white.

In the specification and appended claims, the term "environment" means a computer operation system having a number of characteristics based on hardware and applications. The characteristics based on hardware may include memory, processor, networking, storage, other characteristics for hardware, or combinations thereof. The characteristics based on applications may include an operating system, middleware, a version of an application, other characteristics for applications, or combinations thereof.

Further, as used in the present specification and in the appended claims, the term "a number of" or similar language means any positive number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

FIG. 1 is a diagram of an example of a system for visualizing a congruency of versions of an application across phases of a release pipeline, according to one example of principles described herein. As will be described below, a visualizing system is in communication with a network to represent, via a UI, a congruency for a number of versions of an application compared against a target version of the application across phases of a release pipeline. The congruency for the number of versions of the application is represented by various identifiers. The visualizing system further differentiates a latest-deployed version of the application against a planned version of the application in a particular environment. Further, the visualizing system compares, based on a selection, properties of the versions of the application.

As illustrated in FIG. 1, the system (100) includes a user device (102). In an example, the user device (102) includes a display device (104). As will be described in other parts of this specification, the display device (104) may be used to display, via a UI, a representation of a release pipeline to a user. The release pipeline may include a number of phases. The number of phases may include a development phase, a certification phase, a quality assurance phase, a performance test phase, a system integration phase, a production phase, and other phase. The phases aid a release manager to visualize the delivery of applications throughout the lifecycle of the applications. Further, the release pipeline may include a number of applications and versions of those applications. As a result, the display device (104) represents the release pipeline to a user.

As illustrated, the system (100) includes a database (114). In this example, the database (114) stores, in memory, a number of applications (116). As will be described in other parts of this specification, the applications (116) may be used to aid a visualizing system (110) to display a representation of the applications (116) and versions of the applications (116) within the release pipeline on the display device (104).

As illustrated in FIG. 1, the system (100) includes a visualizing system (110). The visualizing system (110) may be used to represent, via a UI, a congruency for a number of versions of an application compared against a target version of the application across phases of a release pipeline. Again, the congruency for the number of versions of the application represented by a number of identifiers. These identifiers may include a first identifier and/or a second identifier. As will be described in later parts of this specification, the first identifier represents versions of the application that match the target version. The second identifier represents a degree to which the versions of the application match the target version. More information about the identifiers will be described in other parts of this specification.

The visualizing system (110) differentiates a latest-deployed version of the application against a planned version of the application in a particular environment. In an example, the latest-deployed version of the application may be marked with a third identifier.

The visualizing system (110) further compares, based on a selection, properties of the versions of the application. In this example, visualizing system (110) allows a user to select several versions of the application and display, via the display device (104), properties of the versions of the applications. As a result, differences and similarities between several versions of several applications for several phases are visually represented. More information about the visualizing system (110) will be described in other parts of this specification.

While this example has been described with reference to the visualizing system being operated over the network, the visualizing system may be stored and operated locally on a single machine. For example, the visualizing system may be integrated into a user or client device, a server, a database, other locations, or combinations thereof.

Figure 2:
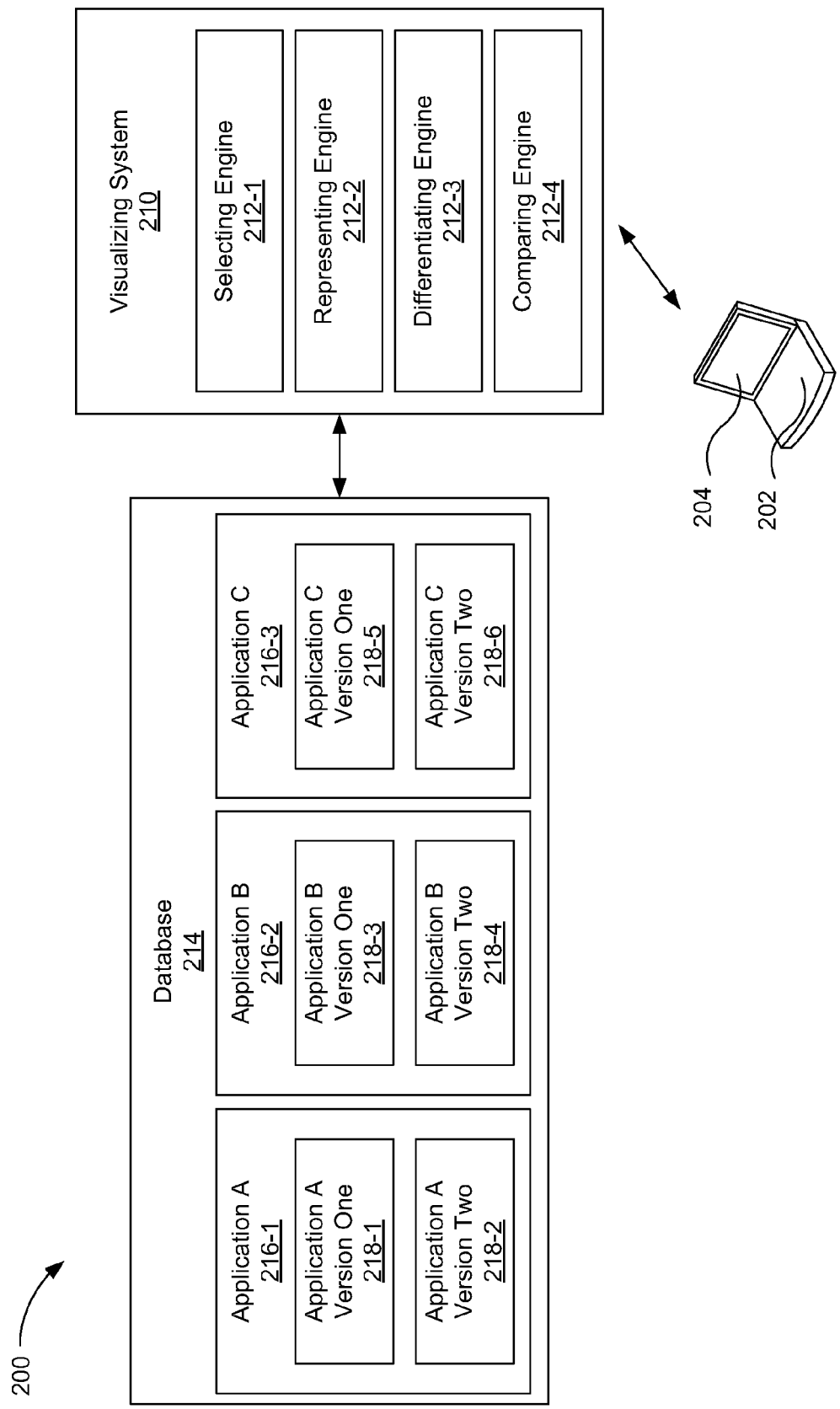
FIG. 2 is a diagram of an example of a system for visualizing a congruency of versions of an application across phases of a release pipeline, according to one example of principles described herein.

FIG. 2 is a diagram of an example of a system for visualizing a congruency of versions of an application across phases of a release pipeline, according to one example of principles described herein. As mentioned above, a visualizing system is in communication with a network to represent, via a UI, a congruency for a number of versions of an application compared against a target version of the application across phases of a release pipeline. The congruency for the various versions of the application is represented by identifiers. The visualizing system further differentiates a latest-deployed version of the application against a planned version of the application in a particular environment. Further, the visualizing system compares, based on a selection, properties of the versions of the application.

As illustrated in FIG. 2, the system (200) includes a user device (202). In an example, the user device (202) includes a display device (204). As mentioned above, the display device (204) may be used to display, via a UI, a representation of a release pipeline to a user, including a number of phases within that pipeline. The number of phases may include a development phase, a certification phase, a quality assurance phase, a performance test phase, a system integration phase, a production phase, and other phases. The phases aid a release manager to visualize the delivery of applications throughout the lifecycle for a number of applications and versions of the applications. As a result, the display device (104) displays the release pipeline to a user. More information about the release pipeline will be described in FIG. 3.

In an example, the system (200) includes a database (214). In this example, the database (214) stores, in memory, a number of applications (216). As illustrated, the database (214) includes application A (216-1), application B (216-2), and application C (216-3). Further, each of the applications (216) may include a number of versions (218). For example, application A (216-1) includes application A version one (218-1) and application A version two (218-2). Application B (216-2) includes application B version one (218-3) and application B version two (218-4). Application C (216-3) includes application C version one (218-5) and application C version two (218-6). As mentioned above, the applications (216) may be used to aid a visualizing system (210) to display the applications (216) and the versions (218) in the release pipeline in the display device (204).

As illustrated in FIG. 2, the system (200) includes a visualizing system (210). The visualizing system (210) includes a number of engines (212). The engines (212) refer to a combination of hardware and program instructions to perform a designated function. Each of the engines (212) may include a processor and memory. The program instructions are stored in the memory and cause the processor to execute the designated function of the engine. As illustrated, the visualizing system (210) includes a selecting engine (212-1), a representing engine (212-2), a differentiating engine (212-3), and a comparing engine (212-4).

As mentioned above, the visualizing system (210) includes the selecting engine (212-1). The selecting engine (212-1) selects a phase from a number of phases. As will be described in other parts of this specification, a representation of a release pipeline may be displayed to a user via a display device (204). As indicated, the release pipeline includes a number of phases, such as a development phase, a certification phase, a quality assurance phase, a performance test phase, a system integration phase, a production phase, and other phase. A user may select at least one of the phases, via the user device (202), and the selecting engine (212-1) receives the selection. For example, the user may select at least one of the phases by clicking a button on a mouse associated with the user device (202).

As mentioned above, the visualizing system (210) includes the representing engine (212-2). The representing engine (212-1) represents, via a UI, a congruency for a number of versions of an application compared against a target version of the application across phases of a release pipeline, the congruency for the number of versions of the application represented by identifiers. For example, when a user selects a phase, the user also in turn selects a target version of the application. As a result, the other versions of the application can be compared against the target version of the application across the phases of the release pipeline.

As mentioned above, the identifiers may include a first identifier. The first identifier identifies versions of the application that matching the target version. The degree to which the compared version must match the target version to receive the first identifier can vary from identical to not identical, but matching to a specified degree or percentage. In a following illustrated example, the first identifier is a horizontal pattern. As a result, versions of the application that match the target version may be rendered as horizontal patterns.

As mentioned above, the identifiers may include a second identifier that represents a degree to which the versions of the application match the target version. In an example, the second identifier is rendered as an intensity of a dot pattern, varying line weights, a numeric or other scale, or combinations thereof. In the following illustrated example, the second identifier is rendered as an intensity of a dot pattern. The darker, i.e. the more intense, the dot pattern, the closer the versions of the application matches the target version.

Returning to FIG. 2, the representing engine (212-1) represents, via a UI, a congruency for a number of versions of an application compared against a target version of the application across phases of a release pipeline, the congruency for the number of versions of the application represented as identifiers by identifying the target version. As mentioned above, this may be accomplished when a user selects a phase.

Further, the representing engine (212-1) represents, via a UI, a congruency for a number of versions of an application compared against a target version of the application across phases of a release pipeline. The congruency for the number of versions of the application is represented by the first and second identifiers as described above.

The visualizing system (210) also includes the differentiating engine (212-3). The differentiating engine (212-3) differentiates a latest-deployed version of the application against a planned version of the application in a particular environment. As will be described in other parts of this specification, the differentiating engine (212-3) exchanges, based on a selection of a user, the latest-deployed version of the application and the planned version of the application to a foreground or a background of the UI. Further, the differentiating engine (212-3) overlaps coordinates associated with the latest-deployed version of the application and the planned version of the application in the UI. In an example, all elements displayed in the UI are defined and displayed via coordinates associated with each of the elements. Further, the coordinates determine where to display each of the elements in the UI. In an example, by overlapping coordinates associated with the latest-deployed version of the application and the planned version of the application in the UI creates a stacking effect to aid the user in distinguishing the latest-deployed version of the application and the planned version of the application in the UI. The differentiating engine (212-3) further renders the latest-deployed version of the application as a third identifier in the UI. In an example, the third identifier may be a color such as white. An example of differentiating a latest-deployed version of the application against a planned version of the application in a particular environment will be described in other parts of this specification.

As mentioned above, the visualizing system (210) also includes the comparing engine (212-4). The comparing engine (212-4) compares, based on a selection, properties of the different versions of the application. The user may select at least one specific version of the application. In response to selecting a specific version of the application, a UI is displayed on the display device (204) that includes a number of properties of that specific version. The properties of a specific version may include a header, an environment, a version identification, a status, a component, or combinations thereof. An example of comparing properties of different versions of the application will be described in other parts of this specification.

Figure 3:
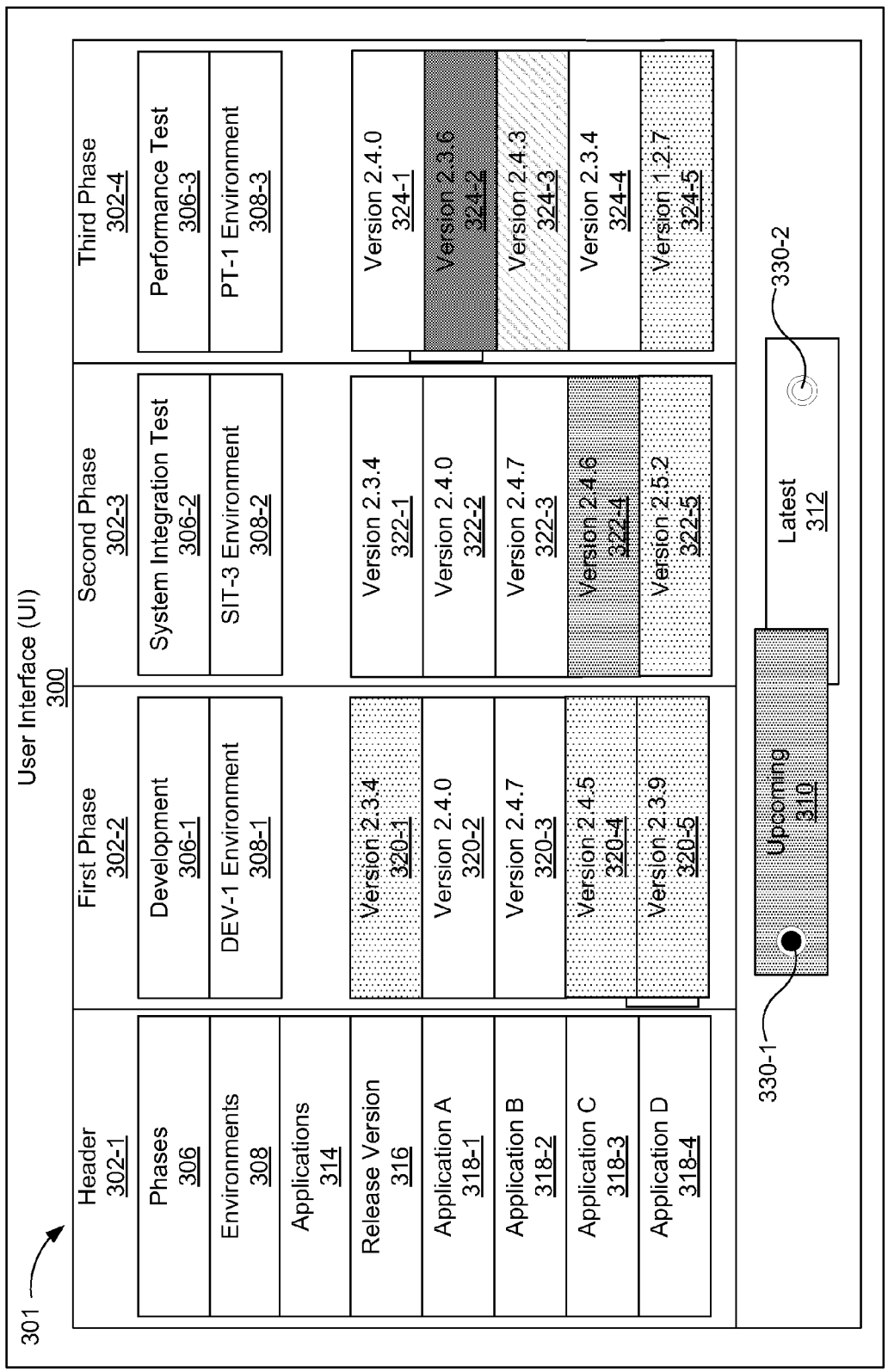
FIG. 3 is a diagram of an example of a release pipeline, according to one example of principles described herein.

FIG. 3 is a diagram of an example of a release pipeline, according to one example of principles described herein. As mentioned above, a display device may be used to display, via a UI, a representation of a release pipeline to a user. A release pipeline may include a number of phases, such as a development phase, a certification phase, a quality assurance phase, a performance test phase, a system integration phase, a production phase, and other phases. The phases aid a release manager to visualize the delivery of applications throughout the lifecycle. Further, the release pipeline may include a number of applications and versions of those applications.

As illustrated in FIG. 3, the representation of a release pipeline (301) is displayed via a UI (300). As illustrated, the release pipeline (301) includes a header (302-1), a first phase (302-2), a second phase (302-3), and a third phase (302-4) represented as columns.

The header (302-1) may be used to navigate the release pipeline (301) via a number of labels (306, 308, 310, 312, 314). As will be described below, the header (302-1) functions as a vertical header for the release pipeline (301). For example, the header labels (306, 308, 310, 312, 314) function to identify information, such as phases, environments, and applications associated with rows of the release pipeline (301). In the illustrated example, the header (302-1) includes a label for phases (306). The label for phases (306) may be used to display names of phases in the first phase (302-2), the second phase (302-3), and the third phase (302-4). For example, the first phase (302-2) may be a development phase (306-1). The second phase (302-3) may be a system integration test phase (306-2). The third phase (302-4) may be a performance test phase (306-3). As a result, all information pertaining to the first phase (302-2), the second phase (302-3), and the third phase (302-4) is organized in the respective columns.

As illustrated, the header (302-1) may include a label for environments (308). The label for environments (308) may be used to display the name of the environment in the first phase (302-2), the second phase (302-3), and the third phase (302-4). For example, the first phase (302-2) may be named DEV-1 environment (308-1). The second phase (302-3) may be named STI-3 environment (308-2). The third phase (302-4) may be named PT-1 environment (308-3). As a result, all information pertaining to the first phase (302-2), the second phase (302-3), and the third phase (302-4) is organized in the respective columns.

In the illustrated example, the release pipeline (301) may also include a radio buttons for selecting the display of either "upcoming" products (310) or the "latest" products (312). The option for "upcoming" (310) may be used to display the date for upcoming applications in the first phase (302-2), the second phase (302-3), and the third phase (302-4). A first radio button (330-1) may be associated with the label for "upcoming" (310). If the user selects the first radio button (330-1), the release pipeline (301) displays planned version of the application on top of latest-deployed versions of the application in the first phase (302-2), the second phase (302-3), and the third phase (302-4). Further, the "upcoming" label (310) is overlapped over a "latest" label (312) as illustrated in FIG. 3. As a result, the first radio button (330-1) may be used as a UI control or switch for displaying upcoming applications.

Further, the release pipeline display (301) may include the label for "latest" (312). A second radio button (330-2) may be associated with the label for "latest" (312). If the user selects the second radio button (330-2), the release pipeline (301) displays latest-deployed versions of the application on top of planned version of the application in the first phase (302-2), the second phase (302-3), and the third phase (302-4). In this case, the "latest" label (312) is overlapped over the "upcoming" label (310) as will be illustrated later on in the specification. As a result, the second radio button (330-2) may be used as a UI control or switch for displaying latest applications.

As illustrated, the header (302-1) may include a label for applications (314). The user may select one of the labels (306, 308, 310, 312, 314) to navigate in the representation of the release pipeline (301). For example, if the user selects the label for applications (314), a release version (316), application A (318-1), application B (318-2), application C (318-3), and application D (318-4) may be displayed in the release pipeline display (301). Specifically, versions (320, 322, 324) of the applications (318) are displayed in the first phase (302-2), the second phase (302-3), and the third phase (302-4). For example, application A (318-1) may include version 2.4.0 (320-2) for the development phase (306-1), version 2.4.0 (322-2) for the system integration test phase (306-2), and version 2.3.6 (324-2) for the performance test phase (306-3). As illustrated, the versions (320, 322, 324) of the applications (318) may be rendered in a number of patterns and/or colors. For example, if a version of the application is rendered in white, the version of the application is a latest-deployed version of an application. Further, a version of the application may be rendered in a dot pattern to indicate an age of the application. For example, version 2.4.6 (322-4) is an older later version of application C (318-3) than version 2.4.5 (320.4) for application C (318-3). Further, if a version of the application is rendered in a diagonal pattern, the version of the application is a focus version. As depicted version 2.4.3 (324-3) is a focus version.

While this example has been described with reference to one environment associated with one phase, several environments may be associated with a phase. For example, a phase may include a first environment for a first operating system and a second environment for a second operating system.

Figure 4:
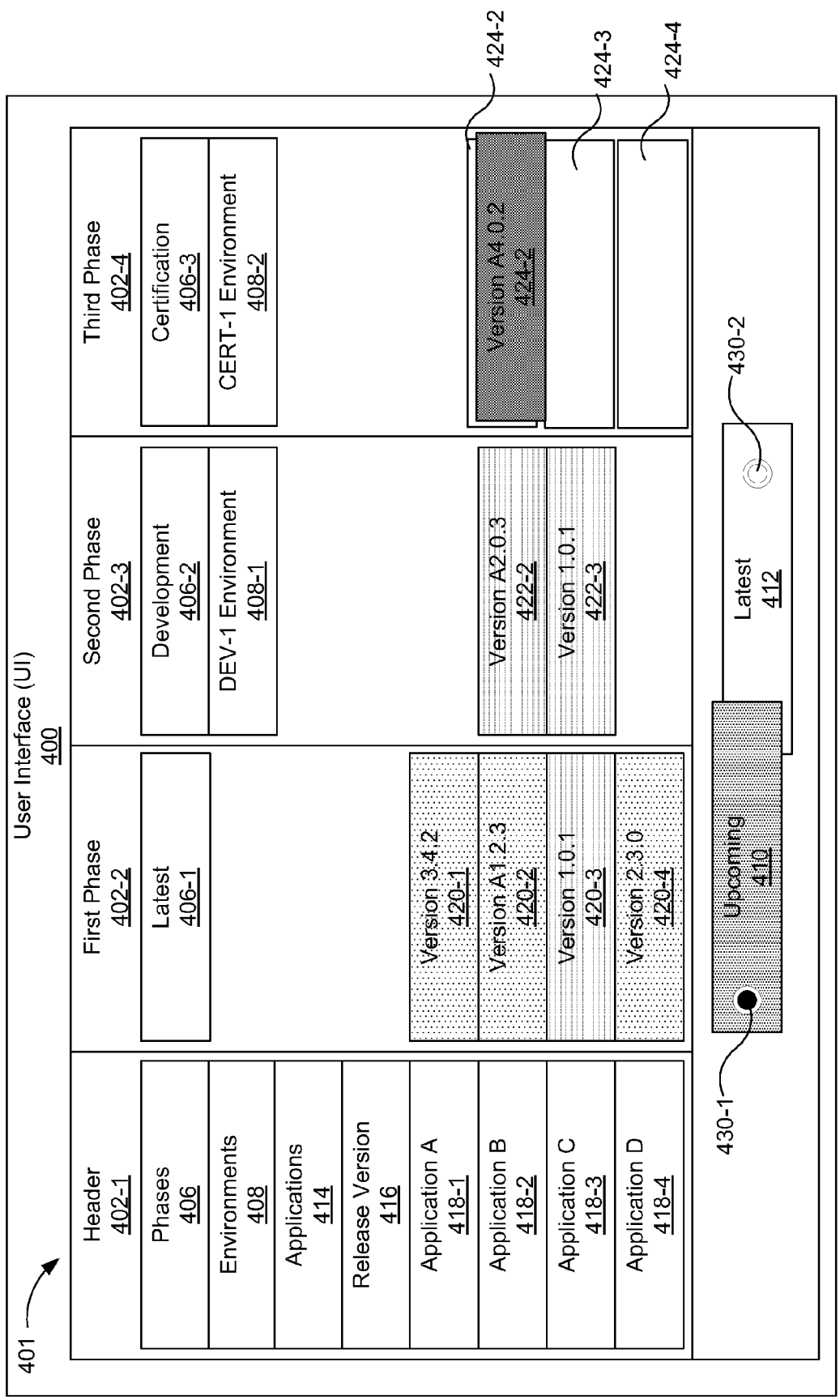
FIG. 4 is a diagram of an example of selecting a phase from a number of phases in a release pipeline, according to one example of principles described herein.

FIG. 4 is a diagram of an example of selecting a phase from a number of phases in a release pipeline, according to one example of principles described herein. As mentioned above, a visualizing system includes the selecting engine. The selecting engine allows a user to selects a phase.

As mentioned above, a release pipeline (401) may be displayed to a user via a UI (400). As illustrated in FIG. 4, the release pipeline (401) includes a number of phases (402-2, 402-3, 404-4) represented as columns. In an example, the number of phases (402-2, 402-3, 404-4) may include labels to identify the phases (402-2, 402-3, 404-4) such as a latest phase (406-1), a development phase (406-2), and a certification phase (402-4). Although not illustrated, the release pipeline (401) may include other phases such as a quality assurance phase, a performance test phase, a system integration phase, a production phase, or combinations thereof. A user may select at least one of the phases (402-2, 402-3, 404-4), via the user device of FIG. 2, and the selecting engine of FIG. 2 receives the selection. For example, the user may select a phase by clicking a button on a mouse associated with the user device of FIG. 2 on any of the columns associated with the phases (402-2, 402-3, 404-4).

For example, the user may select a development phase (406-2) by selecting the second phase (402-3). In this example, when the user selects the development phase (406-2) version A2.0.3 (422-2) becomes the target version for application B (418-2) and version 1.0.1 (422-3) becomes the target version for application C (418-3). As mentioned above, a target version for an application is indicated with a first identifier. In this example, the first identifier may be a pattern, such a horizontal pattern. As a result, version A2.0.3 (422-2) and version 1.0.1 (422-3) are rendered in horizontal patterns. In other example, the first identifier may be rendered as a color, varying line weight or on a numeric or other scale. For example, the first identifier may be rendered as the color green. Further, the first identifier may include four thick lines that create a boarder around the target version. Further, the thinner the four lines, the more the version of the application differs from the target version. In another example, the scale may be represented as numbers, such as 0 to 10, where 10 indicates the version of the application is a target version and 0 indicates the version has no similarities to the target version. Further, the second identifier and third identifier may be represented as described here with line weight or a numerical scale.

As mentioned above, the visualizing system of FIG. 2 renders all the versions (420, 422, 424) of the applications (418) with a first identifier or a second identifier. As mentioned above, the second identifier represents a degree to which the versions of the application match the target version. Again, the second identifier may be depicted with by the intensity of a dot pattern, intensity of a color, different line weights, a numeric or other scale, or combinations thereof.

As illustrated in FIG. 4, version 3.4.2 (420-1) of application A (418-1) is rendered as a pattern such as a light dot pattern. In an example, the light dot pattern indicates that version 3.4.2 (420-1) of application A (418-1) is very different from the target version for application A. This is because version 3.4.2 (420-1) of application A (418-1) does not have a corresponding target version.

As illustrated, version A1.2.3 (420-2) of application B (418-2) is rendered as the light dot pattern. Further, version A4.0.2 (420-2) of application B (418-2) is rendered as a pattern, such as a dark dot pattern. As a result, version A4.0.2 (420-2) of application B (418-2) is has many similarities to the target version, in this example, version A2.0.3 (422-2) of application B (218-2).

Further, version 1.0.1 (420-3) of application C (418-3) is render as a pattern such as a horizontal pattern. In this example, since version 1.0.1 (420-3) of application C (418-3) is rendered as a horizontal pattern, version 1.0.1 (420-3) matches the target version, in this example, version 1.0.1 (422.3).

As illustrated, version 2.3.0 (420-4) of application D (418-4) is rendered as a pattern such as a light dot pattern. The light dot pattern indicates that version 2.3.0 (420-4) of application D (418-4) is significantly different from the target version for application D (418-4). This is because version 2.3.0 (420-4) of application D (418-4) does not have a corresponding target version. As a result, the release pipeline (401) is used to represent, via the UI (400), a congruency for a number of versions (420, 422, 424) of applications (418) compared against target versions (422-2, 422-3) of the applications (418) across the development phase (406) of the release pipeline (401).

Figure 5A:
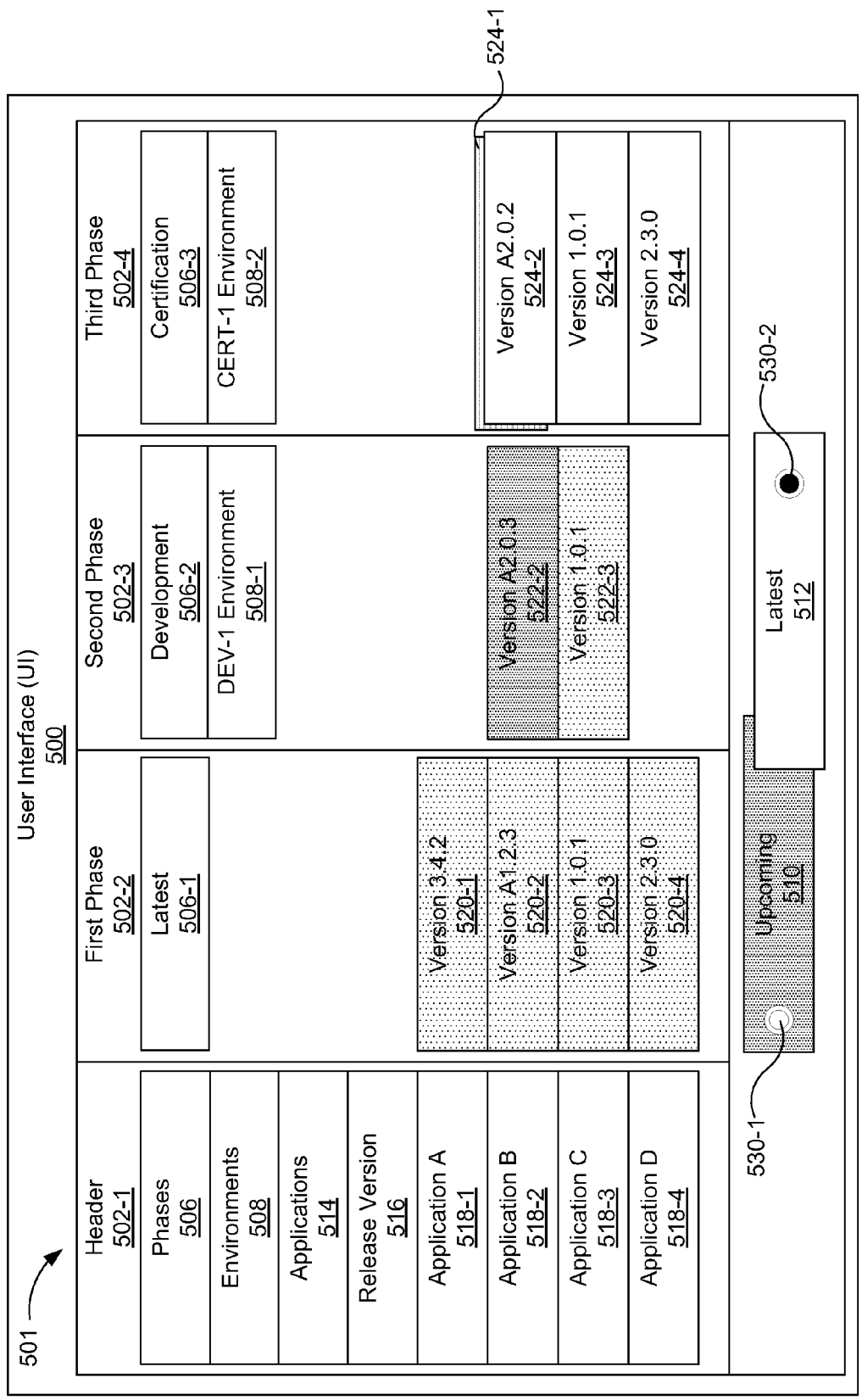
FIG. 5A is a diagram of an example of differentiating a latest-deployed version for the application against a planned version of the application in a particular environment, according to one example of principles described herein.

FIG. 5A is a diagram of an example of differentiating a latest-deployed version of an application against a planned version of the application in a particular environment, according to one example of principles described herein. As mentioned above, a differentiating engine of FIG. 2 may be used to differentiate a latest-deployed version of the application against a planned version of the application in a particular environment.

Figure 5B:
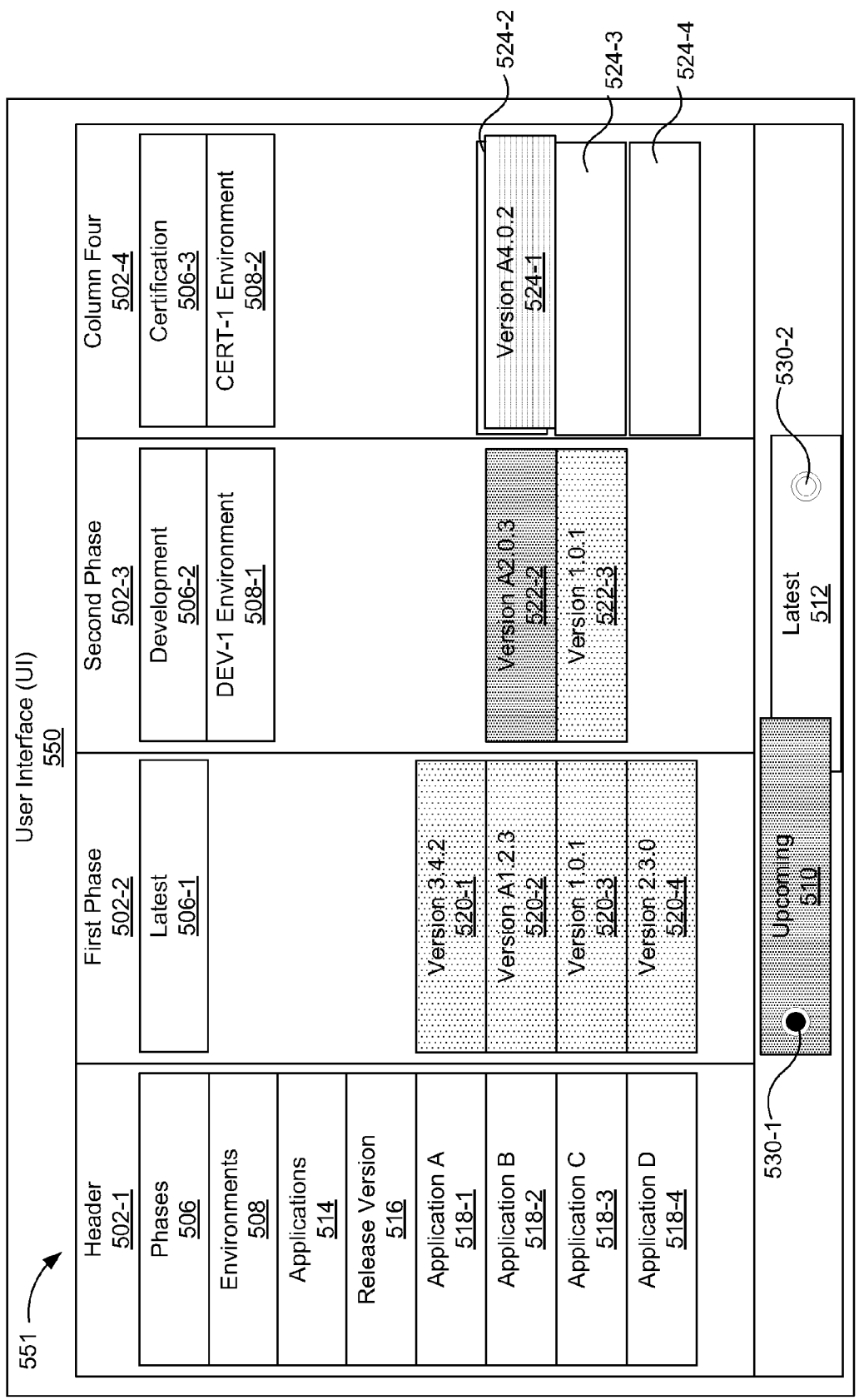
FIG. 5B is a diagram of an example of differentiating a latest-deployed version for the application against a planned version of the application in a particular environment, according to one example of principles described herein.

In the example of FIGS. 5A and 5B, a certification phase (506-3) is selected. As a result, version A4.0.2 (542-1) becomes the target version. Further, the other versions (520, 522) are rendered accordingly.

In the illustrated example, by default, the representation of the release pipeline (501) displays the latest-deployed version of an application for a given environment in the foreground of the release pipeline (501). Differentiating a latest-deployed version of an application against a planned version of the application in a particular environment includes overlapping coordinates associated with the latest-deployed version of the application and the planned version of the application in the UI. As a result, version A4.0.2 (524-1) is illustrated in the background of the release pipeline (501). Further, version A2.0.2 (524-2), version 1.0.1 (524-3), and version 2.3.0 (524-4) are illustrated in the foreground of the release pipeline (501). Further, their coordinates are overlapped as illustrated in FIG. 5A. As mentioned above, this gives a stacking visual effect that conveys the presence of other versions of an application.

FIG. 5B is a diagram of an example of differentiating a latest-deployed version for an application against a planned version of the application in a particular environment, according to one example of principles described herein. As mentioned above, a differentiating engine of FIG. 2 may be used to differentiate a latest-deployed version of the application against a planned version of the application in a particular environment.

As mentioned above, by default, the release pipeline (551) displays the latest-deployed version of an application for a given environment in the foreground of the release pipeline (551). However, the planned version of an application may be displayed in the foreground of the release pipeline (551).

For example, the user may select the upcoming label (510) via a first radio button (530-1). In the illustrated example, the first radio button (530-1) of the upcoming label (510) exchanges the latest-deployed version of the application and the planned version of the application from a background to a foreground of the UI (550). As a result, version A4.0.2 (524-1) is illustrated in the foreground of the release pipeline (551). Further, version A2.0.2 (524-2), version 1.0.1 (524-3), and version 2.3.0 (524-4) are illustrated in the background of the release pipeline (551). Further their coordinates are overlapped as illustrated in FIG. 5B.

In the illustrated example, the user may return to the release pipeline (551) of FIG. 5A by selecting the latest label (512) via a second radio button (530-2). As a result, the latest-deployed version of an application for a given environment is displayed in the foreground of the release pipeline (551). As mentioned above, this gives a stacking visual effect that conveys the presence of other versions of an application.

Figure 6A:
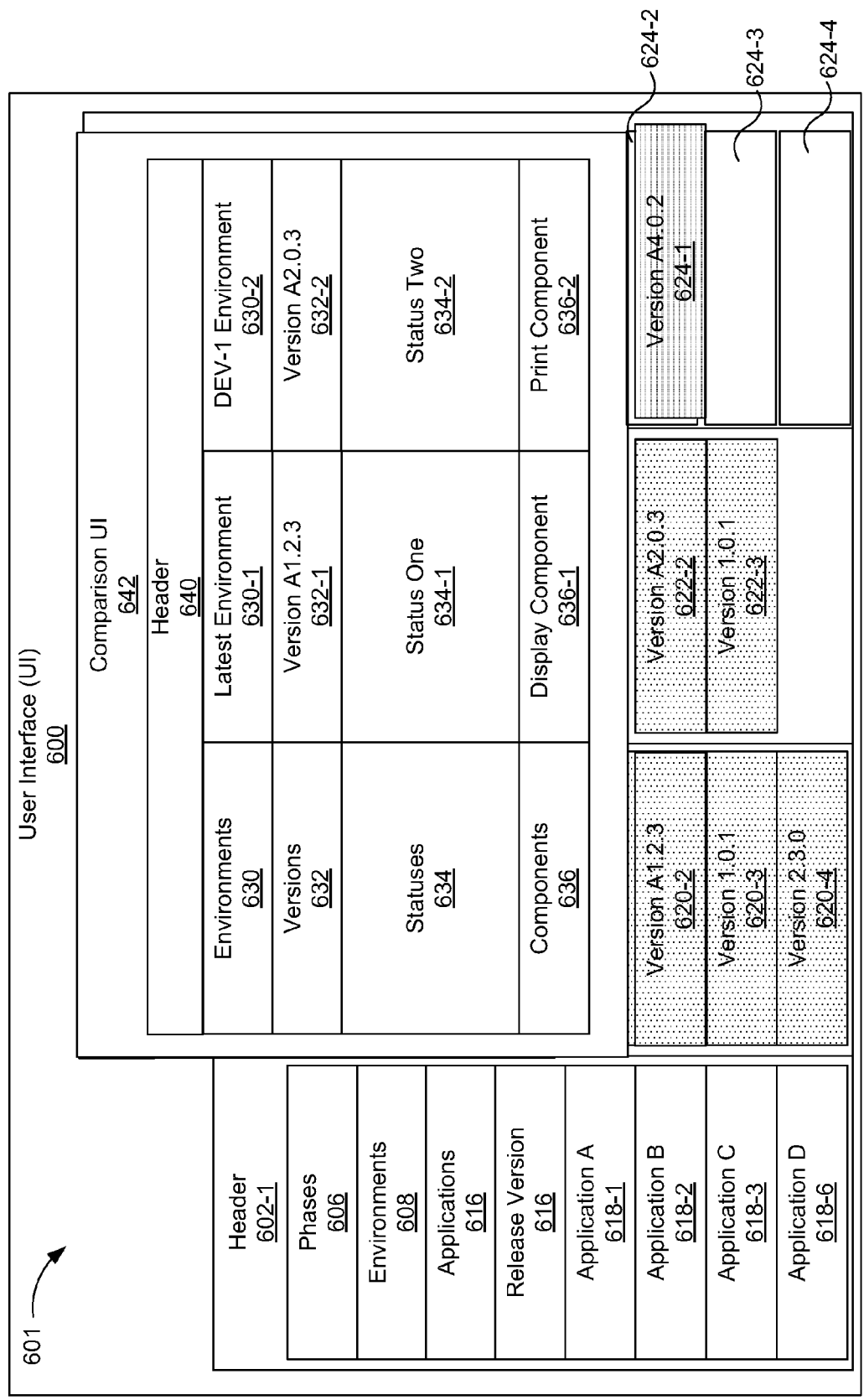
FIG. 6A is a diagram of an example of comparing, based on a selection, properties of versions of an application, according to one example of principles described herein.

FIG. 6A is a diagram of an example of comparing, based on a selection, properties of versions of an application, according to one example of principles described herein. As will be describe below, a user may select a version of an application. In response to selection of a version of the application, a comparison UI displays properties of that version of the application.

As mentioned above, the visualizing system of FIG. 2 includes a comparing engine. The comparing engine compares, based on a user selection, properties of the selected version or versions of the application. Thus, the user may select at least one specific version of an application. For example, the user may select version A1.2.3 (320-2) and version A2.0.3 (622-2).

In this example, by selecting at least one specific version of the versions of an application, a comparison UI (642) is displayed. The comparison UI (642) includes a number of properties of the selected version of the application. The properties of that specific version of the application include a header (640). In the illustrated example, the header (640) may be application B, since the user selected versions of application B (618-2).

Further, the properties of the at least one specific version of the different versions of an application includes environments (630). In an example, version A1.2.3 (320-2) may have been associated with a latest environment and version A2.0.3 (622-2) may have been associated with an environment named DEV-1 environment. As a result, the comparison UI (642) displays the latest environment (630-1) and the DEV-1 environment (630-2).

As illustrated, the properties of the at least one specific version of the versions of an application includes versions (632). Since the user selected version A1.2.3 (320-2) and version A2.0.3 (622-2), version A1.2.3 (632-1) and version A2.0.3 (632-2) are displayed in the comparison UI (642).

Further, the properties of the at least one specific version of the application includes statuses (634). In the illustrated example, statuses may include unit tests pass, integration candidate, quality assurance manager review pass, manual quality assurance pass, unit tested, other statuses, or combinations thereof. As a result, the comparison UI (642) may display any of these statuses for version A1.2.3 (632-1) in status one (634-1). Further, the comparison UI (642) may display any of these statuses for version A2.0.3 (632-2) in status two (634-2).

As illustrated, the properties of the at least one specific version of the application includes an identification of components (636). In an example, the components (636) may correspond to the versions (632). In an example, the components (636) may include components such as a print component, a display component, other components, or combinations thereof. As illustrated, the comparison UI (642) displays a display component (636-1) for version A1.2.3 (632-1), and a print component (636-2) for version A2.0.3 (632-2).

Figure 6B:
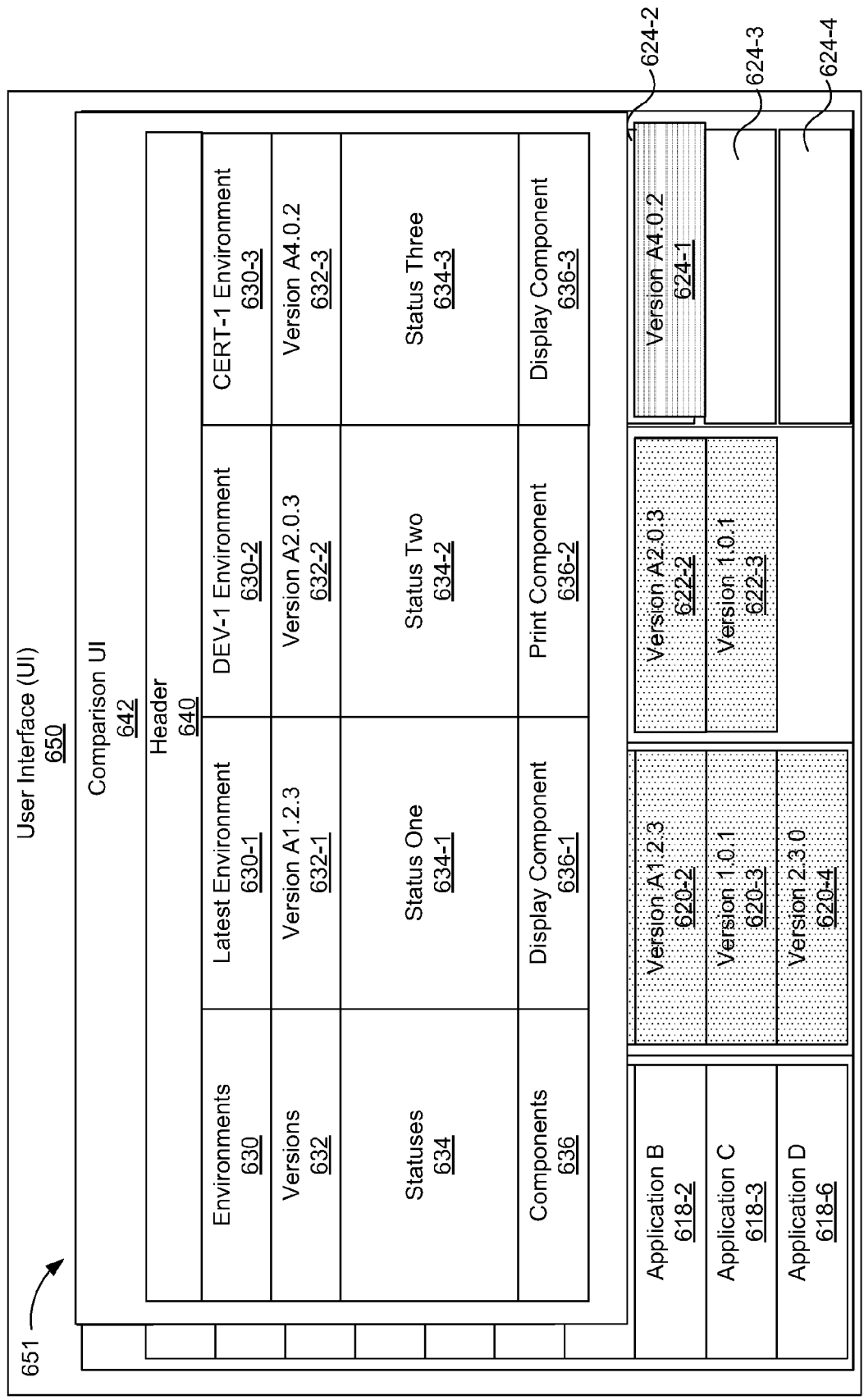
FIG. 6B is a diagram of an example of comparing, based on a selection, properties of versions of an application, according to one example of principles described herein.

FIG. 6B is a diagram of an example of comparing, based on a selection, properties of version of an application, according to one example of principles described herein. As mentioned above, a user may select a version of an application. By selecting the version of the application, a comparison UI displays properties of the version of the application.

In the illustrated example, the user may select a third version of an application to be displayed via the comparison UI (642). For example, the user selects version A4.0.2 (624-1). In an example, the environment, version, status, and components for version A4.0.2 (624-1) are displayed via the comparison UI (642). For example, an environment named CERT-1 environment (630-3) is displayed as the environment for version A4.0.2 (624-1) via the comparison UI (642). Version A4.0.2 (632-3) is displayed as the version via the comparison UI (642). Status three (634-3) is displayed as for the statues (634) via the comparison UI (642). Further, display component (636-3) is displayed for the components (636) via the comparison UI (642). Further, the user may select an additional version of an application to be displayed via the comparison UI (642).

Figure 7:
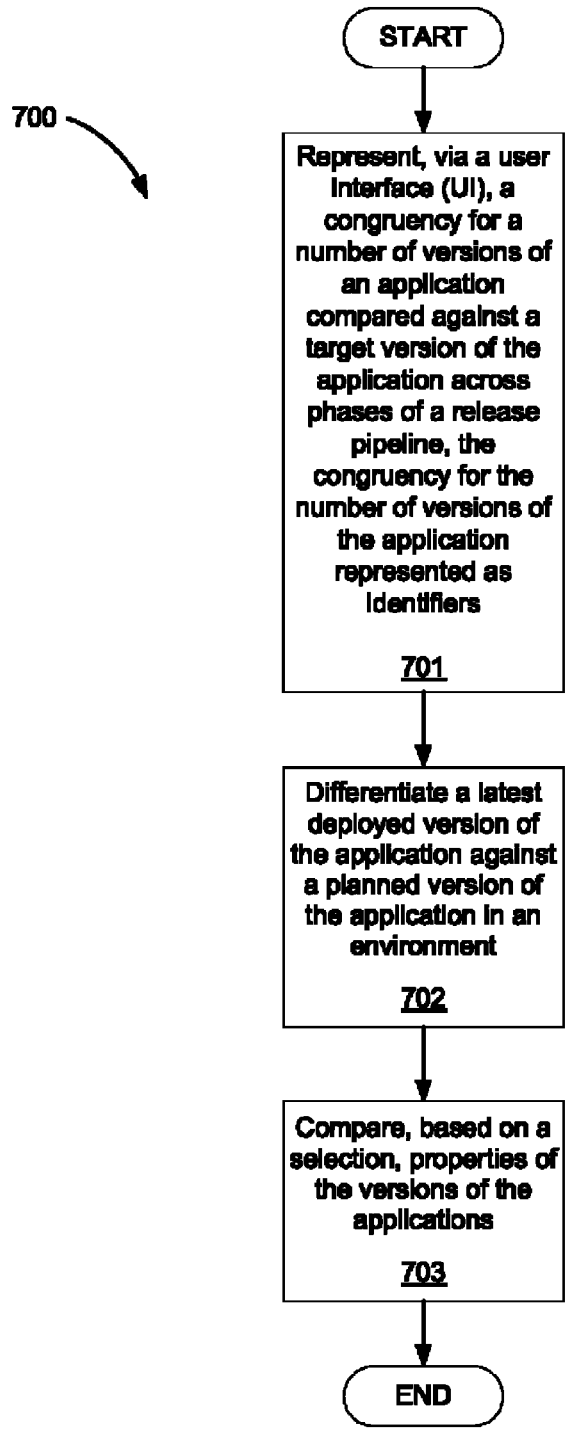
FIG. 7 is a flowchart of an example of a method for visualizing a congruency of versions of an application across phases of a release pipeline, according to one example of principles described herein.

FIG. 7 is a flowchart of an example of a method for visualizing a congruency of versions of an application across phases of a release pipeline, according to one example of principles described herein. In one example, the method (700) may be executed by the visualizing system (100) of FIG. 1. In other examples, the method (700) may be executed by other systems (i.e. system 200). In this example, the method (700) includes representing (701), via a UI, a congruency for a number of versions of an application compared against a target version of the application across phases of a release pipeline, the congruency for the number of versions of the application represented as identifiers, differentiating (702) a latest-deployed version of the application against a planned version of the application in a particular environment, and comparing (703), based on a selection, properties of the versions of the application.

As mentioned above, the method (700) includes representing (701), via a UI, a congruency for a number of versions of an application compared against a target version of the application across phases of a release pipeline, the congruency for the number of versions of the application represented as identifiers. In one example, representing (701), via a UI, a congruency for a number of versions of an application compared against a target version of the application across phases of a release pipeline, the congruency for the number of versions of the application represented as identifiers includes identifying the target version. In this example, there may be a number of versions of an application associated with a phase. Once a user selects a phase, the versions of the application associated with the selected phase become the target version.

Further, representing (701), via a UI, a congruency for a number of versions of an application compared against a target version of the application across phases of a release pipeline, the congruency for the number of versions of the application represented as identifiers includes determining if each of the number of versions of the application are identified with a first identifier or a second identifier and marking the number of versions of the application in the UI with either the first identifier or the second identifier. In the illustrated example, the first identifier identifies the versions of the application that match the target version. In this example, these versions of the application may be rendered with an identifying pattern such as a horizontal pattern. The second identifier represents a degree to which the versions of the application match the target version. For example, if a second identifier for a version of an application is a pattern, such as a dot pattern, the more intense the dot pattern, i.e. a dark dot pattern, the more that version of the application matches the target version.

As mentioned above, the method (700) includes differentiating (702) a latest-deployed version of the application against a planned version of the application in a particular environment. As mentioned above, differentiating (702) a latest-deployed version of the application against a planned version of the application in a particular environment includes exchanging, based on a selection of a user, the latest-deployed version of the application and the planned version of the application to a foreground or a background of the UI.

Further, differentiating (702) a latest-deployed version of the application against a planned version of the application in a particular environment includes overlapping coordinates associated with the latest-deployed version of the application and the planned version of the application in the UI. In the illustrated example, differentiating (702) a latest-deployed version of the application against a planned version of the application in a particular environment includes identifying the latest-deployed version of the application with a third identifier in the UI. In the illustrated example, the third identifier may be a color, such as white. This creates a staking effect as illustrated in FIGS. 5A and 5B.

As mentioned above, the method (700) includes comparing (703), based on a selection, properties of the versions of the application. Comparing (703), based on a selection, the properties of the versions of the application includes selecting at least one specific version of the application. For example, a user may select least one specific version by clicking on a version of an application.

Further, comparing (703) properties of the versions of the application includes displaying the properties of the at least one specific version. In this example, the properties of the versions of the application include a header, an environment, a version, a status, a component, or combinations thereof.

Figure 8:
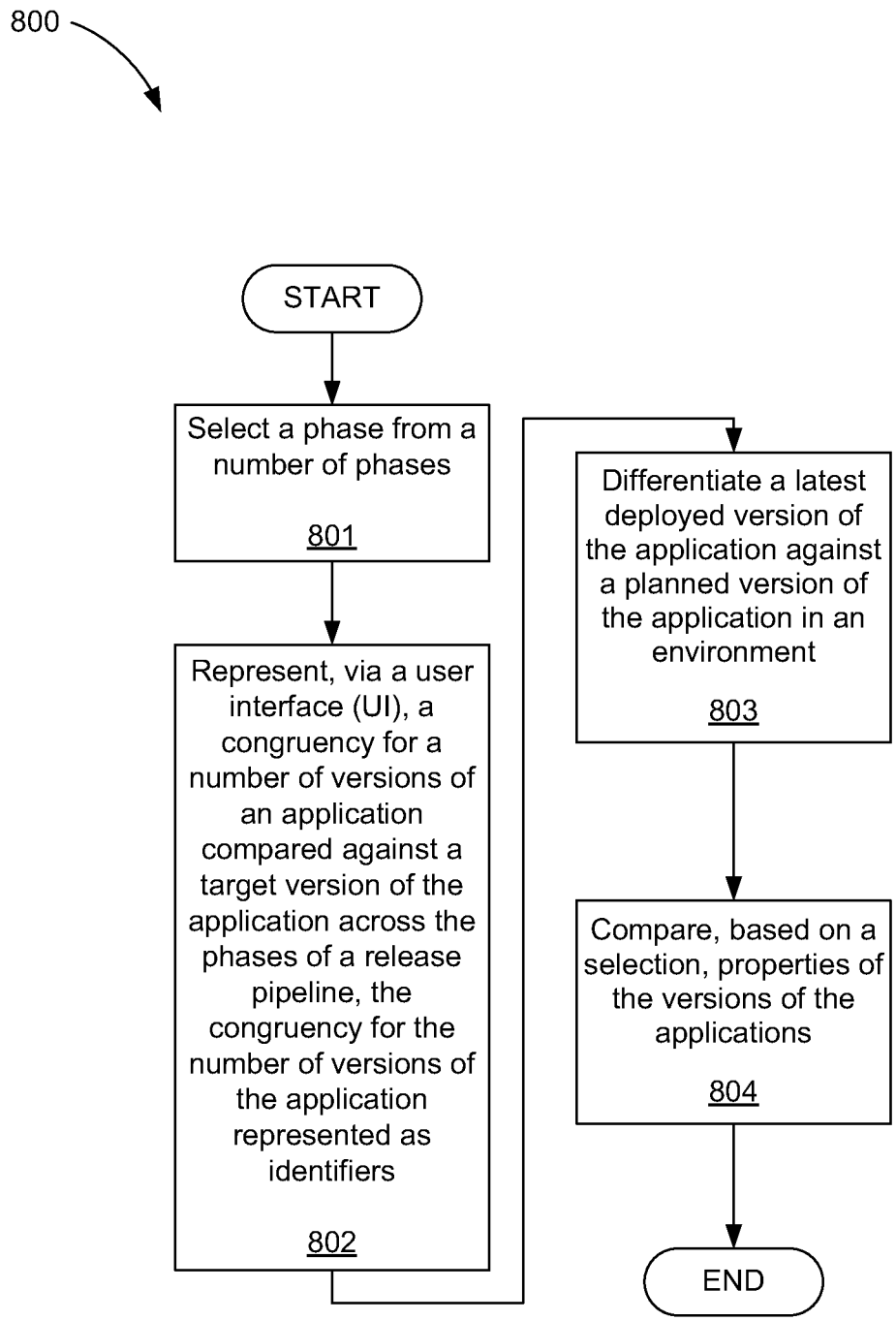
FIG. 8 is a flowchart of an example of a method for visualizing a congruency of versions of an application across phases of a release pipeline, according to one example of principles described herein.

FIG. 8 is a flowchart of an example of a method for visualizing a congruency of versions of an application across phases of a release pipeline, according to one example of principles described herein. In one example, the method (800) may be executed by the visualizing system (100) of FIG. 1. In other examples, the method (800) may be executed by other systems (i.e. system 200). In this example, the method (800) includes selecting (801) a phase from a number of phases, representing (802), via a UI, a congruency for a number of versions of an application compared against a target version of the application across the phases of a release pipeline, the congruency for the number of versions of the application represented as identifiers, differentiating (803) a latest-deployed version of the application against a planned version of the application in a particular environment, and comparing (804), based on a selection, properties of the versions of the application.

As mentioned above, the method (800) includes selecting (801) a phase from a number of phases. In an example, the number of phases may be displayed, via a UI, in a release pipeline. In an example, the phases may include a development phase, a certification phase, a quality assurance phase, a performance test phase, a system integration phase, a production phase, and other phases. In an example, a user may select a phase by selecting a column corresponding to a phase. For example, if the release pipeline includes column two which is titled development phase, the use may click, via a mouse, on column two. As a result, the development phase is selected.

Figure 9:
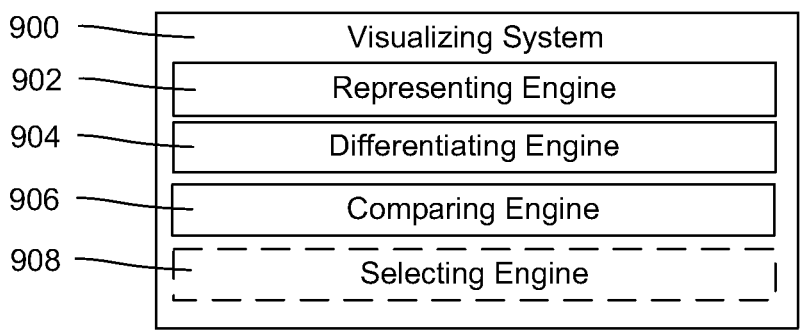
FIG. 9 is a diagram of an example of a visualizing system, according to the principles described herein.

FIG. 9 is a diagram of an example of a visualizing system, according to the principles described herein. The visualizing system (900) includes a representing engine (902), a differentiating engine (904), and a comparing engine (906). In this example, the visualizing system (900) also includes a selecting engine (908). The engines (902, 904, 906, 908) refer to a combination of hardware and program instructions to perform a designated function. Each of the engines (902, 904, 906, 908) may include a processor and memory. The program instructions are stored in the memory and cause the processor to execute the designated function of the engine.

The representing engine (902) represents, via a UI, a congruency for a number of versions of an application compared against a target version of the application across phases of a release pipeline, the congruency for the number of versions of the application represented as identifiers. In an example, the identifiers may include a first identifier. In an example, the first identifier represents versions of the application that match the target version. Further, the identifiers include a second identifier. In an example the second identifier represents a degree to which the versions of the application match the target version. In an example, the second identifier is rendered as an intensity of a color, a line, a scale, a pattern, or combinations thereof. In an example, the representing engine (902) identifies the target version, determines if each of the number of versions of the application is rendered as a first identifier or a second identifier, and renders the number of versions of the application in the UI as the first identifier or the second identifier.

The differentiating engine (904) differentiates a latest-deployed version of the application against a planned version of the application in a particular environment. In an example, the differentiating engine (904) exchanges, based on a selection of a user, the latest-deployed version of the application and the planned version of the application to a foreground or a background of the UI. Further, the differentiating engine (904) overlaps coordinates associated with the latest-deployed version of the application and the planned version of the application in the UI. Further, the differentiating engine (904) renders the latest-deployed version of the application as a third identifier in the UI.

The comparing engine (906) compares, based on the selection, properties of the versions of the application. In the illustrated example, the properties of the versions of the application include a header, an environment, a version, a status, a component, or combinations thereof. The comparing engine (906) allows a user to select at least one specific version of the versions of the application. The comparing engine (906) the displays the properties of the at least one specific version.

The selecting engine (908) selects at least one phase from a number of phases. In an example, the selecting engine (908) allows a user to select at least one of the phases.

Figure 10:
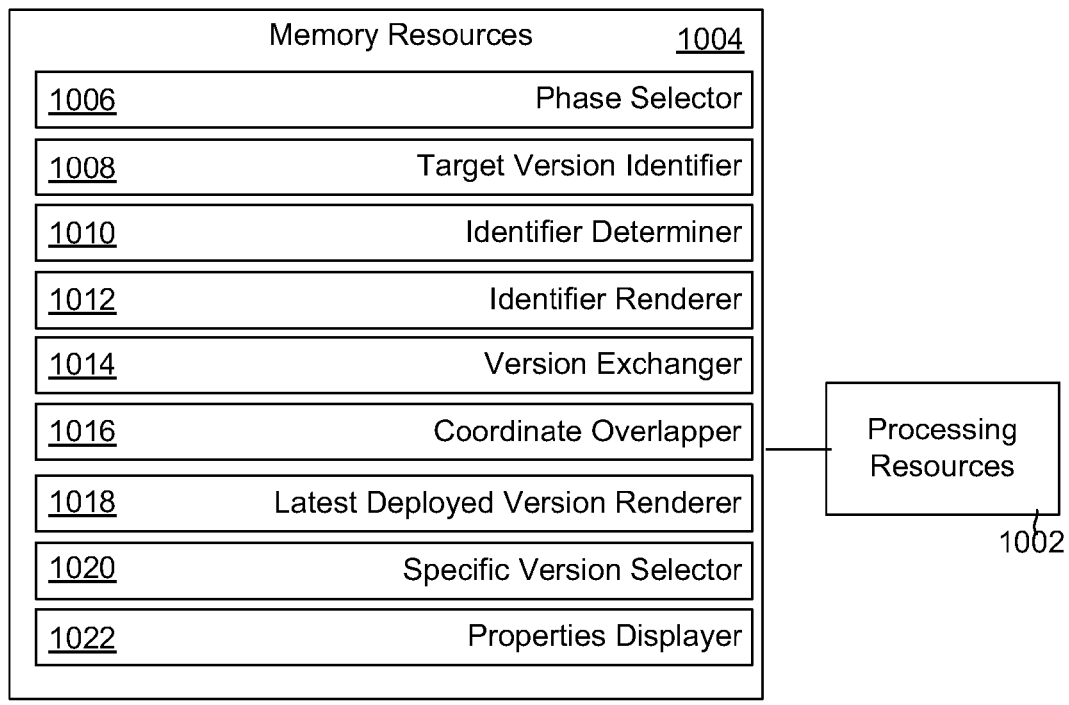
FIG. 10 is a diagram of an example of a visualizing system, according to the principles described herein.

FIG. 10 is a diagram of an example of a visualizing system, according to the principles described herein. In this example, the visualizing system (1000) includes processing resources (1002) that are in communication with memory resources (1004). Processing resources (1002) include at least one processor and other resources used to process programmed instructions. The memory resources (1004) represent generally any memory capable of storing data such as programmed instructions or data structures used by the visualizing system (1000). The programmed instructions shown stored in the memory resources (1004) include a phase selector (1006), a target version identifier (1008), an identifier determiner (1010), an identifier renderer (1012), a version exchanger (1014), a coordinate overlapper (1016), a latest-deployed version renderer (1018), a specific version selector (1020), and a properties displayer (1022).

The memory resources (1004) include a computer readable storage medium that contains computer readable program code to cause tasks to be executed by the processing resources (1002). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The phase selector (1006) represents programmed instructions that, when executed, cause the processing resources (1002) to select a phase from a number of phases. The target version identifier (1008) represents programmed instructions that, when executed, cause the processing resources (1002) to identify a target version.

The identifier determiner (1010) represents programmed instructions that, when executed, cause the processing resources (1002) to determine if each of a number of versions of an application are to be marked with a first identifier or a second identifier. The identifier renderer (1012) represents programmed instructions that, when executed, cause the processing resources (1002) to render the number of versions of the application in the UI as marked with either the first identifier or the second identifier.

The version exchanger (1014) represents programmed instructions that, when executed, cause the processing resources (1002) to exchange, based on a selection of a user, a latest-deployed version of the application and a planned version of the application to a foreground or a background of the UI. The coordinate overlapper (1016) represents programmed instructions that, when executed, cause the processing resources (1002) to overlapping coordinates associated with the latest-deployed version of the application and the planned version of the application in the UI.

The latest-deployed version renderer (1018) represents programmed instructions that, when executed, cause the processing resources (1002) to mark the latest-deployed version of the application with a third identifier in the UI. The specific version selector (1020) represents programmed instructions that, when executed, cause the processing resources (1002) to select at least one specific version of the versions of the application. The properties displayer (1022) represents programmed instructions that, when executed, cause the processing resources (1002) to display properties of the at least one specific version.

Further, the memory resources (1004) may be part of an installation package. In response to installing the installation package, the programmed instructions of the memory resources (1004) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (1002) and the memory resources (1004) are located within the same physical component, such as a server, or a network component. The memory resources (1004) may be part of the physical component's main memory, caches, registers, non-volatile memory, or elsewhere in the physical component's memory hierarchy. Alternatively, the memory resources (1004) may be in communication with the processing resources (1002) over a network. Further, the data structures, such as the libraries, may be accessed from a remote location over a network connection while the programmed instructions are located locally. Thus, visualizing system (1000) may be implemented on a user device, on a server, on a collection of servers, or combinations thereof.

The visualizing system (1000) of FIG. 10 may be part of a general purpose computer. However, in alternative examples, the visualizing system (1000) is part of an application specific integrated circuit (ASIC).

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicated otherwise. It will be further understood that the terms "comprises" and/or "comprising" when used in the specification, specify the presence of stated features, integers, operations, elements, and/or components, but do not preclude the presence or addition of a number of other features, integers, operations, elements, components, and/or groups thereof.

What is claimed is:

1. A system for visualizing a congruency of versions of an application across phases of a release pipeline, the system comprising:
   a selecting engine, comprising a processor, to select a phase from a number of phases;
   a representing engine, comprising a processor, to represent, via a user interface (UI), a congruency for a number of versions of an application compared against a target version of the application across the phases of a release pipeline, the congruency for the number of versions of the application represented with identifiers by:
  identifying the target version;
  determining if each of the number of versions of the application are rendered as a first identifier or a second identifier; and
  rendering the number of versions of the application in the UI as the first identifier or the second identifier;
a differentiating engine, comprising a processor, to differentiate a latest-deployed version of the application against a planned version of the application in a particular environment by:
  exchanging, based on a selection of a user, the latest-deployed version of the application and the planned version of the application to a foreground or a background of the UI;
  overlapping coordinates associated with the latest-deployed version of the application and the planned version of the application in the UI; and
  rendering the latest-deployed version of the application as a third identifier in the UI; and
a comparing engine, comprising a processor, to compare, based on a selection, properties of the versions of the application.

2. The system of claim 1, in which the identifiers comprise:
a first identifier, the first identifier representing the versions of the application that match the target version; and
a second identifier, the second identifier representing a degree to which the versions of the application match the target version.

3. The system of claim 2, in which the second identifier comprises an intensity of a color, a varying line weight, a scale value, a pattern, or combinations thereof.

4. The system of claim 2, wherein:
the first identifier is at least one of a pattern and a color; and
the second identifier is an intensity of the pattern or the color.

5. The system of claim 1, in which the properties of the versions of the application comprise a header, an environment, a version, a status, a component, or combinations thereof.

6. The system of claim 1, in which the comparing engine compares, based on the selection, the properties of the versions for the application by:
selecting at least one specific version from the versions of the application; and
displaying the properties of the at least one specific version.

7. The system of claim 1, wherein the phase is at least one of a development phase, certification phase, a quality assurance phase, a performance test phase, a system integration phrase, and a production phase.

8. The system of claim 1, wherein:
identifying the target version comprises selecting a phase; and
a version of the application associated with a selected phase becomes the target version.

9. A computer program product for visualizing a congruency of versions of an application across phases of a release pipeline, comprising:
a non-transitory computer readable storage medium, said tangible computer readable storage medium comprising computer readable program code embodied therewith, said computer readable program code comprising program instructions that, when executed, causes a processor to:
  select a phase from a number of phases, wherein:
    a phase is a stage of development for an application; and
    each phase has multiple versions of an application;
  represent, via a user interface (UI), a congruency for a number of versions of several applications compared against a target version of the several applications across phases of a release pipeline, the congruency for the number of versions of the application represented as identifiers, wherein:
    the identifiers comprise:
      a first identifier, which is a pattern, to represent the versions of the application that match the target version; and
      a second identifier, which is an intensity of the pattern, to represent a degree to which the versions of the application match the target version; and
      a third identifier, which is a color, to represent whether a version is a latest-deployed version of the application; and
    the phase are represented as columns;
  differentiate a latest-deployed version of the application against a planned version of the application in a particular environment; and
  compare, based on a selection, properties of the versions of the application, wherein the properties that are compared include a header, an environment, a version, a status, a component, or combinations thereof; and display, via the UI, the release pipeline for the several applications.

10. The product of claim 9, further comprising computer readable program code comprising program instructions that, when executed, cause said processor to select a phase from the number of phases.

11. The product of claim 9, further comprising computer readable program code comprising program instructions that, when executed, cause said processor to differentiate a latest-deployed version of the application against a planned version of the application in a particular environment.

12. The product of claim 9, further comprising computer readable program code comprising program instructions that, when executed, cause said processor to compare, based on a selection, properties of the versions of the application.

13. The product of claim 9, in which identifiers comprise:
a first identifier, the first identifier representing the versions of the application that match the target version; and
a second identifier, the second identifier representing a degree to which the versions of the application match the target version.

14. The product of claim 9, wherein a first identifier that represents the versions of the application that match the target version is a pattern.

15. The product of claim 9, further comprising computer readable program code comprising program instructions that, when executed cause said processor to display a comparison user interface that displays a number of properties of selected versions of the application.

16. The product of claim 15, further comprising computer readable program code comprising program instructions that, when executed cause said processor to display, in the comparison user interface, at least one of a status and a component associated with the selected versions.

17. The product of claim 16, wherein a status comprises at least one of a unit tests pass, an integration candidate, a quality assurance manager review pass, a manual quality assurance pass, and a unit tested.

18. A system for visualizing a congruency of versions of an application across phases of a release pipeline, the system comprising:
- a selecting engine, comprising a processor, to select a phase from a number of phases, wherein:
  - a phase is a stage of development for an application; and
  - each phase has multiple versions of an application;
- a representing engine, comprising a processor, to represent, via a user interface (UI), a congruency for a number of versions of an application compared against a target version of the application across the phases of a release pipeline, the congruency for the number of versions of the application represented with identifiers, wherein: the identifiers comprise:
  - a first identifier, which is a pattern, to represent the versions of the application that match the target version; and
  - a second identifier, which is an intensity of the pattern, to represent a degree to which the versions of the application match the target version; and
  - a third identifier, which is a color, to represent whether a version is a latest-deployed version of the application; and
  - the phases are represented as columns;
- a differentiating engine, comprising a processor, to differentiate a latest-deployed version of the application against a planned version of the application in a particular environment; and
- a comparing engine, comprising a processor, to compare, based on a selection, properties of the versions of the application, wherein the properties that are compared include a header, an environment, a version, a status, a component, or combinations thereof.

* * * * *